Dec. 16, 1969   S. K. LANGE ET AL   3,484,800
GAS PURIFYING PLANT

Filed Nov. 14, 1967   3 Sheets-Sheet 1

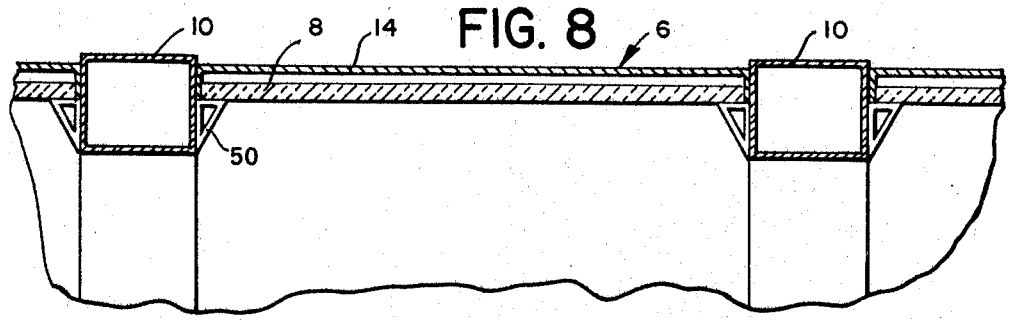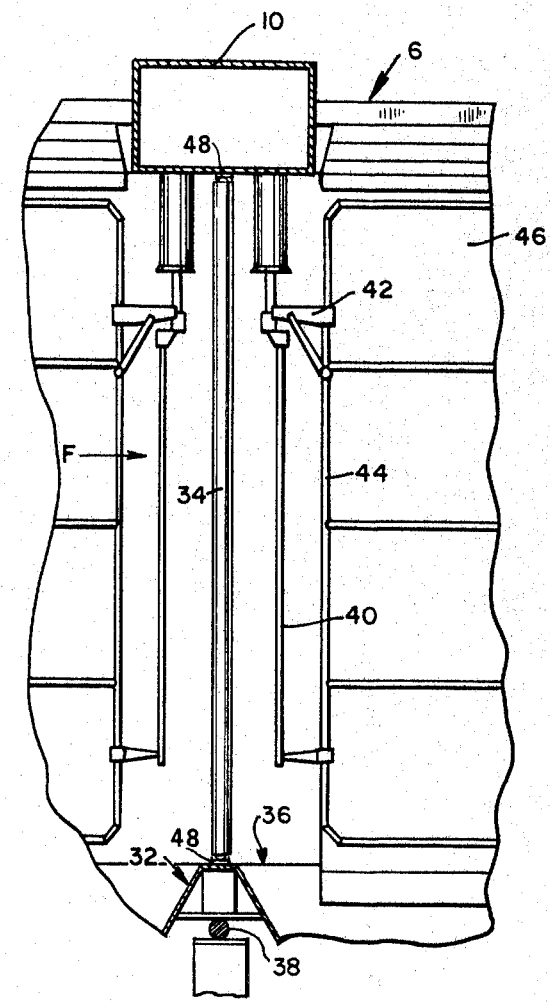

United States Patent Office 3,484,800
Patented Dec. 16, 1969

3,484,800
GAS PURIFYING PLANT
Siegfried Karl Lange, Günther Erich Naumann, Rolf Hans Engler and Hans-Joachim Reinhold Nicolai, Leipzig, Germany, assignors, by mesne assignments, to VEB Metalleichtbaukombinat - Forschungsinstitut, Leipzig, Germany
Filed Nov. 14, 1967, Ser. No. 682,879
Int. Cl. B03c 3/02, 3/01
U.S. Cl. 55—148                                    9 Claims

ABSTRACT OF THE DISCLOSURE

Purifying plant, particularly for electrostatic purification of flue gases, comprising three major units, namely a housing structure, a purifying structure in the housing structure and in the path of the gas flow, and a main supporting structure for the housing structure, separate therefrom and erected outside thereof. The housing structure has wall and cover portions constituted by housing plates; the main supporting structure consists of vertical frame posts outside the housing wall portions, and transversal girders linking the frame posts outside the housing cover portion. Preferably, there is a single immovable connection between the main supporting structure and the housing structure at a point in the area of one of the joints between the housing plates, preferably on the relatively cold gas-inlet side of the housing.

---

The invention relates to a gas purifying plant, particularly for the electrostatic purification of flue gases.

Housings for flue-gas purifying plants, such as electrofilters, are known where the supporting structures and the housing walls are joined directly with each other by welds. The supporting structures are arranged inside the housing.

In these plants very hot gases are moved, and the pressure conditions vary on the outer and the inner surfaces of the housing walls. The housings have supports and connections for stabilization, so-called cross-bracings and spacers.

Housings are also known whose supporting structures consists of portal frames with diagonal bands arranged inside the housings and whose side panels are lined with zigzag-shaped plates. Due to different conditions of use, these parts are generally produced individually, according to individual specifications.

The known plants have the disadvantage that the supporting structure is considerably heated due to the direct connection of the housings with the supporting structures, and the arrangement of the latter in the range of the hot gases, so that the supporting capacity and the deformation behavior are adversely affected and cannot be controlled.

The cross-bracings and spacing bars arranged inside the housing to reduce the resulting uncontrollable variations produce a turbulent gas flow which reduced the efficiency of the purifying plant.

The longitudinal and areal displacements effect deformations in the entire plant despite the cross-bracings, and make it necessary to provide compensators on the gas-inlet and outlet sides of the housing. These compensators are highly susceptible to trouble in operation and have a shorter life due to inadequate insulation. Additional supports are required in the range of the compensators. The design of the housing leads to limitations regarding the size of the plant. Due to the necessary arrangement of supporting partitions. Due to the necessary arrangement of supporting partitions, the plants must be laid out as double filters.

It is one of the major objects of the invention to avoid deformation in the housing, with the respective supporting structure, caused by irregular heat flow, and the arrangement of compensators at the filter devices, as well as the appearance of turbulent gas flow. Furthermore, unlimited width and length of the plant should be possible.

The invention provides a solution to the problem of separating the supporting structure from the housing proper and the equipment inside the housing in such a way that heat transfer by so-called heat bridges is practically impossible so as to compensate the elongations caused in the housing while they are formed, and to eliminate the devices in the housing which effect turbulence in the air current. At the same time the inner equipment is to be arranged in the direction of the greater width of the housing.

According to the invention, the problem is primarily solved by the provision of a main supporting structure consisting of transversal girders and frame posts, arranged outside a housing which consists of heat-insulating, preferably flexible and expansion-compensating plates, movably at the points arranged in the area of the plate butts.

With greater housing widths, hinged supports are assigned to the main supporting structure, in whose area are arranged supporting frames serving to hold spray frames, and provided with brackets extending preferably obliquely to the housing axis (or the gas flow), to receive the spray frames.

The housing plates, including cover plates and lining panels, are filled with insulating material, and they may be provided on all sides with expansion joints. The plates are connected unremovably or immovably with the main supporting structure by means of connecting elements, such as screws and the like, and by way of intermediate plates.

The expansion joints are covered on the inside by cover strips secured at one side to the cover plates. On the outside the expansion joints are provided with spacers which are connected with the plates, for example, by welds. In order to obtain a gas-tight seal, the intermediate plates are also connected with the housing plates, for example, by welding seams.

Dust bunkers are arranged under the housing so that the bunker plane serves to increase the supporting effect as a tensional and pressural member, respectively.

The hinged supports associated with the main supporting structure, but placed inside the housing proper, are preferably designed as flow sections so as to reduce resistance to the hot flue gas.

The solution according to the present invention does not only lead to an increase in the safety and life expectancy of gas purifying plants but it permits at the same time standardization in the planning and design as well as a rational pre-fabrication by using the assembly system. Beyond that, it permits substantial savings in material. Due to the elimination of cross-bracings and spacing bars arranged inside the housing, a practically laminar gas flow is obtained so that the separating capacity of the plant is also increased without increase of the electrical input. The invention permits furthermore the production of large housings which could not be realized up to now.

The various objects, features and attendant advantages of the present invention will become more apparent from the following description of a preferred, exemplary embodiment of the inventive gas purifying plant when considered in conjunction with the accompanying drawings, wherein FIG. 1 shows a side elevation of a gas purifying plant according to the invention, in the direction of the gas flow;

FIG. 8 is a partial inner side view, supplementing FIG. 7, and also showing portions of the housing and the outer supporting structure; and FIG. 9 is a vertical sectional view of the inner equipment, showing its suspension from the supporting structure by way of frames and brackets.

Figure 1:
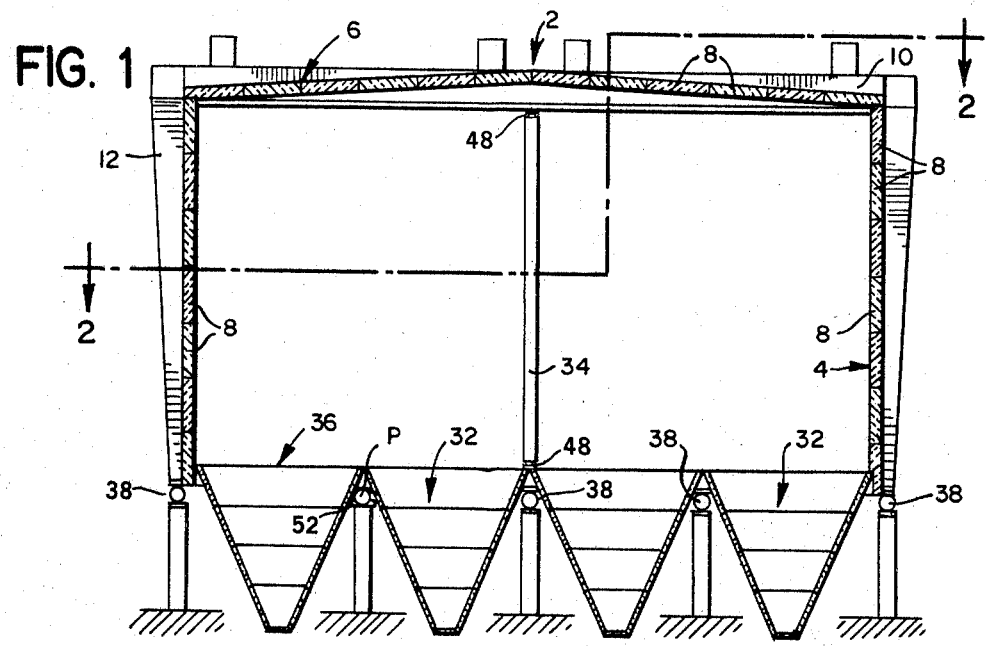
Figure 2:
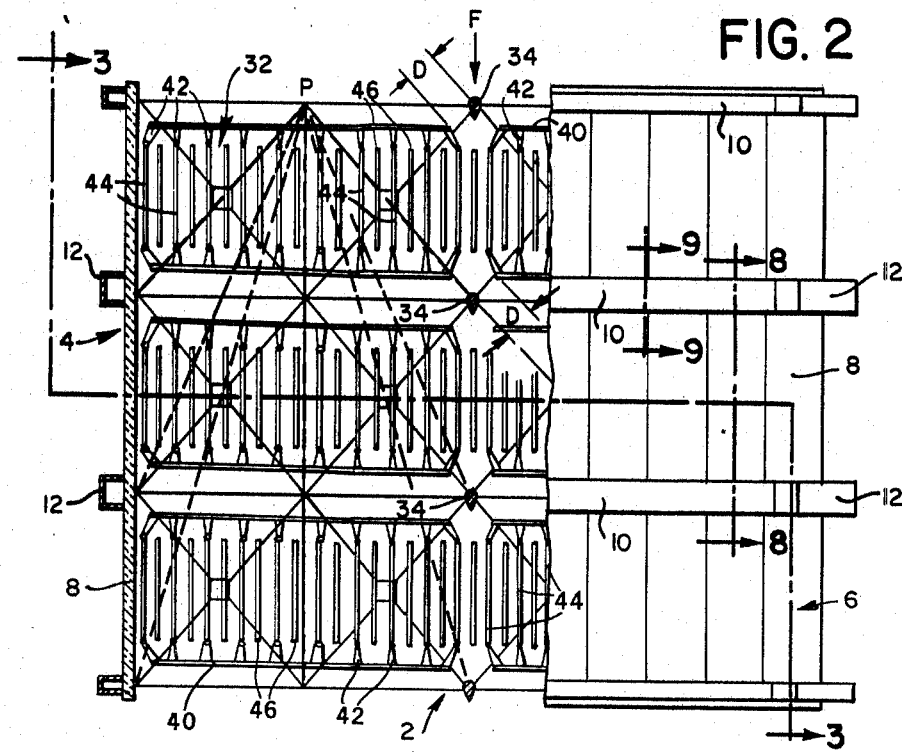
FIG. 2 is a partly sectional top view of the plant represented in FIG. 1, along line 2—2 thereof.
Figure 3:
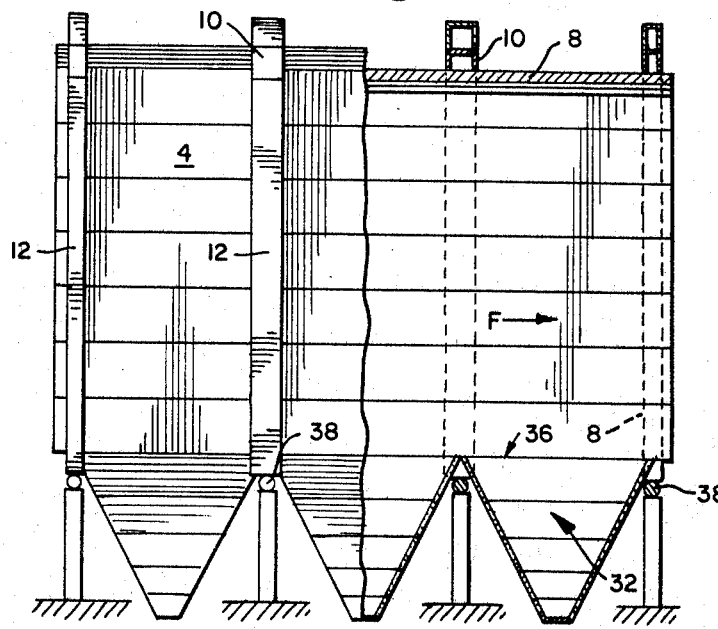
FIG. 3 shows a partly sectional side elevation of the plant, along line 3—3 of FIG. 2.

As shown in FIGS. 1 to 3, a housing 2, consisting of walls 4 and a cover 6, and divided into sections, is assembled of housing plates 8. The supporting structure, outside of the housing 2, consists of plate or transverse girders 10 and frame posts 12, which are arranged at the head and the end, as well as between, the various sections of the housing 2 in the direction F of the gas flow. This is indicated in FIGS. 2, 3, 7 and 9.

Figure 4:
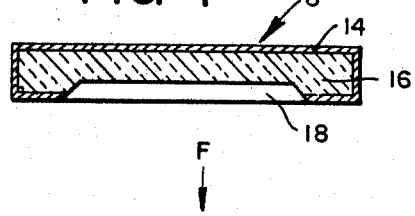
FIG. 4 is a cross-sectional view of a housing plate.

The housing plates 8 (see FIGS. 4 and 5) consist of a cover plate 14 which is made of a bent plate strip to ensure elasticity. Toward the outside of the housing is applied an insulating layer 16, protected by a covering panel 18. It is also possible to use air as an insulator (not shown) with a gas-tight construction of the housing plates.

Figure 5:
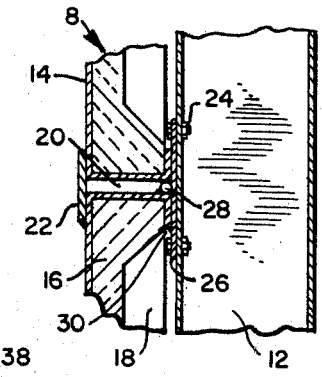
FIG. 5 shows the cross section of an expansion joint and the junction of two housing plates according to FIG. 4, with supporting structure constituting an enlarged, sectional partial view of FIG. 1 (e.g. on the right-hand side)

As shown in FIG. 5, between the plates 8 are arranged on all sides expansion joints 20 which are covered on the inside with cover ledges or strips 22. These strips, attached to the cover plates 14, are secured on one side so that distance variations are made possible in the expansion joints 20.

The plates 8 are secured, as shown in FIG. 5, by means of screws 24 by way of intermediate plates 26 on the supporting structure (frame posts 12). Attachment to the girders 10 is similar to that just described. On the outside are arranged, between the expansion joints 20, spacers 28 which are welded with the housing plates 8. In order to obtain a gas-tight seal, the intermediate plates 26 are welded likewise with the housing plates 8 in a fillet 30.

The housing 2 is closed at the bottom by one or more dust collecting bunkers 32, as shown in FIGS. 1, 3 and 9.

Figure 7:
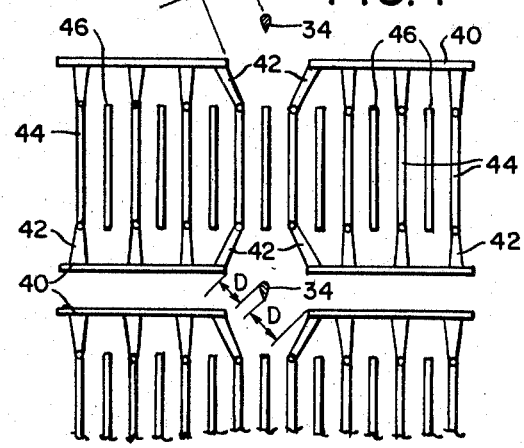
FIG. 7 shows the arrangement of the elements of the purifying equipment inside the housing, constituting an enlarged sectional view of FIG. 2 but without portions of the housing.

With great housing widths, the girders 10 are supported by hinged supports 34, intermediate the frame posts 12. These are preferably designed as flow sections, as shown in FIGS. 2 and 7.

The upper plane 36 of the bunker or bunkers 32, shown in FIGS. 1 and 3, corresponds more or less to a rigid disk or frame, due to its insulation and gas-tight seal, which is exposed to the radiant heat of the gases.

Figure 6:
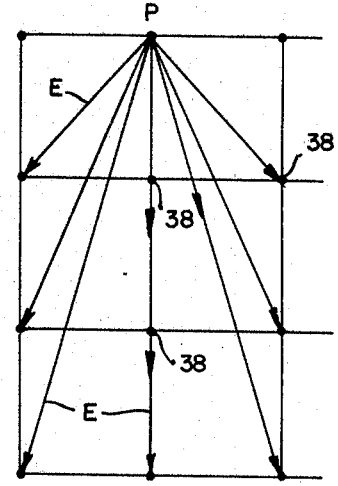
FIG. 6 is a graphic representation (also applied to a portion of FIG. 2) of the polar bearing arrangement relative to a fixed point.

The resulting heat expansion must be determined to avoid forced stresses by a corresponding arrangement and design of the bearings. Movable bearings 38 are therefore provided, as shown in FIGS. 1, 3, 9, and schematically in FIG. 6, the latter in a polar arrangement relative to an optionally selected single fixed point P of the bunker plane 36, expansion capacity E being insured without forced stresses. The bunker plane 36 is used as a tensional and pressural member for a supporting effect. All movable bearings 38 including those of the main supporting structure 10, 12 are arranged according to this principle and schematic outlay of FIG. 6.

On a supporting frame 40 are arranged, inside the housing 2, preferably obliquely in the range of the hinged supports 34, if any, brackets 42 which permit a yielding preservation of distance D of the interior equipment. The latter may consist of spray frames 44 and/or filter plates 46, as shown in FIGS. 2 and 7. It will be understood, however, that the inventive arrangement of the gas purifying plant may accommodate other purifying elements inside the housing and the main supporting structure surrounding the same.

Preferably cup-shaped bearings 48 are provided for both ends of the hinged supports 34, as shown in FIGS. 1 and 9 in a somewhat schematic manner (on a small scale).

FIG. 8 illustrates brackets 50 by which the housing plates 8 of the cover 6 are supported from the girders 10.

It should be noted that all bearings or supports 38 (underneath the frame posts 12 as well as the hinged supports 34) are of the flat, relatively movable type, with the exception of the sole bearing at the fixed point P which has cup-shaped bearing portions 52 (see FIG. 1 on a small scale) for preventing relative movement between the supporting and supported elements.

The point P is preferably disposed on the side of the housing 2 facing the gas inlet; that is, on the relatively cold side of the structure. Any unavoidable small expansion due to the hot gases will thus tend to move the relatively movable bearings away from the fixed point P.

With reference to FIGS. 2 and 7 it should be noted that the distances D, shown between the supports 34 and the closest edges of the supporting frames 40 are not to scale. In fact, they do not have to be identical although a symmetrical arrangement has proved to be advantageous. The distances may be governed, for example, by the electric voltages applied to the spray frames 44 in case of electrostatic dust precipitation.

FIG. 9 shows the suspension of the puirfying equipment from above, by way of electric insulators and other conventional elements which need not be described in detail since they do not form part of the inventive structure.

The operation of the inventive gas purifying plant can be described as follows: For purifying the waste or flue gases of large furnaces (for example, for steam generators, cement kilns and the like) are used, among others, electric flue-gas purifying plants. They are generally arranged directly behind the combustion plant. In this zone the flue gases still have temperatures of about 500° C. The elimination of the dust and other impurity particles from the flue gases is effected by ionization. Spray frames and filter plates are respectively charged positively and negatively so that an electric field originates from the spray frames with their spray bars, which charges the dust particles of the flue gases and attracts them to the oppositely charged filter plates. The dust accumulates on the latter until the dust layer drops, upon tapping, into one of the dust bunkers.

The filter width is determined by the admissible velocity of the dust-laden flue gases.

This type of purifying plant, including spray frames and filter plates, is arranged in a housing, as was described. The housing construction is composed generally of the supporting structures which consists of the frame posts and the girders, and of the side walls, as well as the cover and the dust bunkers.

The housing construction and the dust bunkers are all insulated against heat radiation and are gas-tight for operating reasons. The customary design of the filter housings for electro-filters corresponded so far to the following state of technology which differs from the new invention described herein.

The cover and the side walls were designed in the known filter housings as reinforced plate panels. The upper filter covering bears on distribution girders which is arranged, in these known plants, intermediate the cross girders of the main supporting structure, and the side walls are connected directly and immovably with the girders of the main supporting structure.

In order to ensure lateral stability of the housing construction and for mutual support of the side walls loaded with underpressure, corresponding bracings or cross-bars were arranged in the range of the girders of the main supporting structure on the gas-inlet and outlet sides of the housing inside the gas current.

The housing could only be laid out up to a certain size, due to its construction, which necessitated the use of several small filter housings.

The latter as well as the bunkers were supported on concrete supports by means of conventional bearing members, like rollers and the like, for axial expansion. Due to the rigid housing construction, the roller bearings were arranged in the filter axis so that there was a possibility of movement in the filter axis, and thermal expansion could be compensated. In the transverse direction similar considerations have generally been disregarded so far since the length was usually greater than the width in the conventional filter housing.

In the known design, the gas distribution and the gas passage in the filter equipment, as a result of turbulent flow, are unfavorably influenced by the bracings and cross-bars arranged in the housing, which resulted in an unstable operation of the electro-filter and reduction of its degree of separation.

Furthermore the radiant heat of the gas had an unfavorable effect on the entire housing construction since its supporting capacity and stability to deformation were unfavorably influenced and reduced respectively, which could lead to housing deformations and cracks. Since it was not possible to determine exactly by calculation the effect of heat on the housing construction, it was necessary to make corresponding assumptions and to consider this influence respectively by using stronger materials in the construction.

The technical and economical disadvantages of the known structures increased with increasing size of the filters which jeopardized the manufacture of large-size electro-filters altogether.

As pointed out in the preceding specification, thermal expansion is compensated according to the invention, and the use of substatially greater filter widths becomes possible, particularly when the hinged supports are used.

The new construction permits manufacture according to the assembly system which provides the prerequisites for standardization with different conditions of use.

What we claim is:

1. A gas purifying plant, particularly for electrostatic purification of flue gases, comprising, in combination: a housing structure including wall and cover portions; a purifying structure disposed within said housing structure in the path of the gas flow which constitutes a heat zone, and including a plurality of spray frames in the path of the gas flow, a number of transversal supporting frames attached to said cover portions for holding said spray frames in spaced-apart relationship, and a plurality of brackets interconnecting said spray frames with said supporting frames; a main supporting structure for said housing structure, separate therefrom and erected in its major part outside thereof; said wall and cover portions being constituted by a plurality of housing plates, with means joining said housing plates in an expansion-compensating manner; and said main supporting structure consisting of a number of substantially vertical frame posts outside said wall portions, and transversal girders linking said frame posts at least partly outside said cover portions and entirely outside the heat zone of the gas flow, and an immovable connection between adjoining structural elements of said main supporting structure and said housing structure at at least one point in the area of joining means between said housing plates.

2. The gas purifying plant as defined in claim 1, wherein said housing plates are flexible and provided with heat-insulating means.

3. The gas purifying plant as defined in claim 1, wherein the gas flow is in the direction of the smaller width of said housing structure, while said purifying structure is disposed therein in a substantially transversal direction along the greater width of said housing structure, substantially parallel to the side walls of the latter.

4. The gas purifying plant as defined in claim 1, wherein said housing plates include inner cover plates and parallel outer cover panels, as well as a layer of heat-insulating material therebetween.

5. The gas purifying plant as defined in claim 1, wherein said housing plates have expansion joints therebetween, and further include on their outside intermediate plates for immovably connecting said housing plates to said frame posts.

6. The gas purifying plant as defined in claim 5, wherein said housing plates further include on their inside strips covering said expansion joints and being secured to cover plates forming part of said housing plates, and spacers secured to the latter and facing said frame posts.

7. The gas purifying plant as defined in claim 6, wherein said intermediate plates are connected with said housing plates along fillets by way of welding seams thereby producing a gas-tight seal.

8. The gas purifying plant as defined in claim 1, wherein said housing structure further includes at least one dust bunker arranged beneath said housing wall portions for collecting the dust and impurities removed from the gas, the top plane of said dust bunker constituting frame means serving to increase the effect of said main supporting structure, as a tensional and pressural member.

9. A gas purifying plant particularly for electrostatic purification of flue gases, comprising, in combination; a housing structure; a purifying structure disposed within said housing structure in the path of the gas flow; a main supporting structure for said housing structure, separate therefrom and erected in its major part outside thereof; said housing structure including wall and cover portions constituted by a plurality of housing plates, with means joining said housing plates in an expansion-compensating manner; said main supporting structure consisting of a number of substantially vertical frame posts outside said wall portions, and transversal girders linking said frame posts at least partly outside said cover portions; an immovable connection between adjoining structural elements of said main supporting structure and said housing structure at at least one point in the area of said joining means between said housing plates; said purifying structure including a plurality of spray frames in the path of the gas flow, a number of transversal supporting frames attached to said cover portions for holding said spray frames in spaced-apart relationship, and a plurality of brackets interconnecting said spray frames with said supporting frames; the gas flow being in the direction of the smaller width of said housing structure, while said purifying structure is disposed therein in a substantially transversal direction along the greater direction along the greater width of said housing structure, substantially parallel to the side walls of the latter; said main supporting structure further including substantially vertical hinge supports for said cover portions, in the shape of flow sections pointing in the direction of the gas flow, intermediate said frame posts and inside said housing structure; at least some of said brackets, in the region of said hinge supoprts, extending at an angle with respect to the path of the gas flow.

(References on following page)

References Cited

UNITED STATES PATENTS

| | | | |
|---|---|---|---|
| 981,884 | 1/1911 | Ruhl | 52—167 |
| 1,584,055 | 5/1926 | Weiskopf | 55—145 X |
| 1,761,322 | 6/1930 | Wels | 52—167 |
| 2,014,643 | 9/1935 | Bakker | 52—573 X |
| 2,221,603 | 11/1940 | Penney | 55—129 |
| 2,349,550 | 5/1944 | Hedberg | 55—128 |
| 2,384,859 | 9/1945 | Thayer | 52—483 |
| 2,460,052 | 1/1949 | Werner | 52—573 X |
| 2,737,259 | 3/1956 | Harlow | 55—147 X |
| 2,746,563 | 5/1956 | Harlow | 23—175 X |
| 2,948,984 | 8/1960 | Thom | 52—573 X |
| 2,973,055 | 2/1961 | Aitkenhead | 55—129 |
| 3,041,807 | 7/1962 | Getzin et al. | 55—143 |
| 3,070,196 | 12/1962 | Switzgable | 52—404 |
| 3,100,952 | 8/1963 | Hall | 52—573 X |
| 3,105,252 | 10/1963 | Milk | 52—167 X |
| 3,183,626 | 5/1965 | Schmitt | 52—573 X |
| 3,290,845 | 12/1966 | Snyder | 52—404 X |
| 3,366,375 | 1/1968 | Jones | 263—46 |
| 3,398,491 | 8/1968 | Babcock | 52—90 |

FOREIGN PATENTS 738,241  10/1955  Great Britain.

HARRY B. THORNTON, Primary Examiner

D. E. TALBERT, Jr., Assistant Examiner

U.S. Cl. X.R.

52—90, 197, 263, 404, 483, 573; 55—267, 358

UNITED STATES PATENT OFFICE
CERTIFICATE OF CORRECTION

Patent No. 3,484,800      Dated December 16, 1969

Inventor(s) Siegfried Karl Lange, et al.

It is certified that error appears in the above-identified patent and that said Letters Patent are hereby corrected as shown below:

Column 5, line 75, before "joining means" insert -- said --. Column 6, line 65, cancel "direction along the greater"; line 68, "hinge" should read -- hinged --; line 72, "hinge supoprts" should read -- hinged supports --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents